US006824806B2

(12) United States Patent
Anzalone

(10) Patent No.: US 6,824,806 B2
(45) Date of Patent: Nov. 30, 2004

(54) PROCESS FOR PREPARING A MEAT SUBSTITUTE

(75) Inventor: Beniamino Anzalone, Rome (IT)

(73) Assignee: Green Live Vegetable Meat S.R.L., Rome (IT)

( * ) Notice: Subject to any disclaimer, the term of this patent is extended or adjusted under 35 U.S.C. 154(b) by 285 days.

(21) Appl. No.: 10/225,172

(22) Filed: Aug. 22, 2002

(65) Prior Publication Data

US 2003/0054081 A1 Mar. 20, 2003

Related U.S. Application Data

(63) Continuation-in-part of application No. 09/230,545, filed as application No. PCT/IB97/00488 on May 5, 1997, now abandoned.

(30) Foreign Application Priority Data

Jul. 30, 1996 (IT) ........................................ RM96A0549
Mar. 26, 1997 (EP) ............................................ 97105024

(51) Int. Cl.$^7$ ............................... A23J 3/18; A23L 1/10
(52) U.S. Cl. ....................... 426/549; 426/412; 426/550; 426/656; 426/802
(58) Field of Search ................................ 426/412, 549, 426/550, 656, 802

(56) References Cited

U.S. PATENT DOCUMENTS

| 3,645,747 A | 2/1972 | Palmer |
| 3,806,611 A | 4/1974 | Sawada et al. ............. 426/276 |
| 3,833,022 A | 9/1974 | Turbak et al. ........... 138/118.1 |
| 3,886,298 A | 5/1975 | Hayes, Jr. et al. .......... 426/656 |
| 3,928,652 A | 12/1975 | Lanter ........................ 426/643 |
| 4,178,394 A | 12/1979 | Kumar ....................... 426/656 |
| 4,328,252 A | 5/1982 | Murray et al. .............. 426/262 |

FOREIGN PATENT DOCUMENTS

| EP | 0 262 276 | 9/1986 |
| WO | 94/28738 | 12/1994 |

*Primary Examiner*—Arthur L. Corbin
(74) *Attorney, Agent, or Firm*—Young & Thompson

(57) ABSTRACT

A process for producing a vegetable food which is alternative to meat, which process consists of the steps of providing a mixture consisting essentially of 45 to 99.9% by weight of gluten and 0.1 to 55% by weight of a flour selected from the group consisting of cereal flours, legume flours and mixtures thereof, admixing said mixture of gluten and flour with water or vegetable broth, in a ratio of 1 kg of said mixture per 0.8 to 1.0 liter of water or vegetable broth, kneading the admixture until a dough is obtained, stuffing the dough into synthetic casings, which are closed with clips or laces at their ends, so as to obtain shaped pieces, cooking the thus-obtained shaped pieces for 105 to 120 minutes, during which time the dough expands and finds room by lengthening, and a meat-like fibrous structure develops, wherein fibers show a moderate orientation in the longitudinal direction and, in certain portions, a twisted orientation.

15 Claims, 1 Drawing Sheet

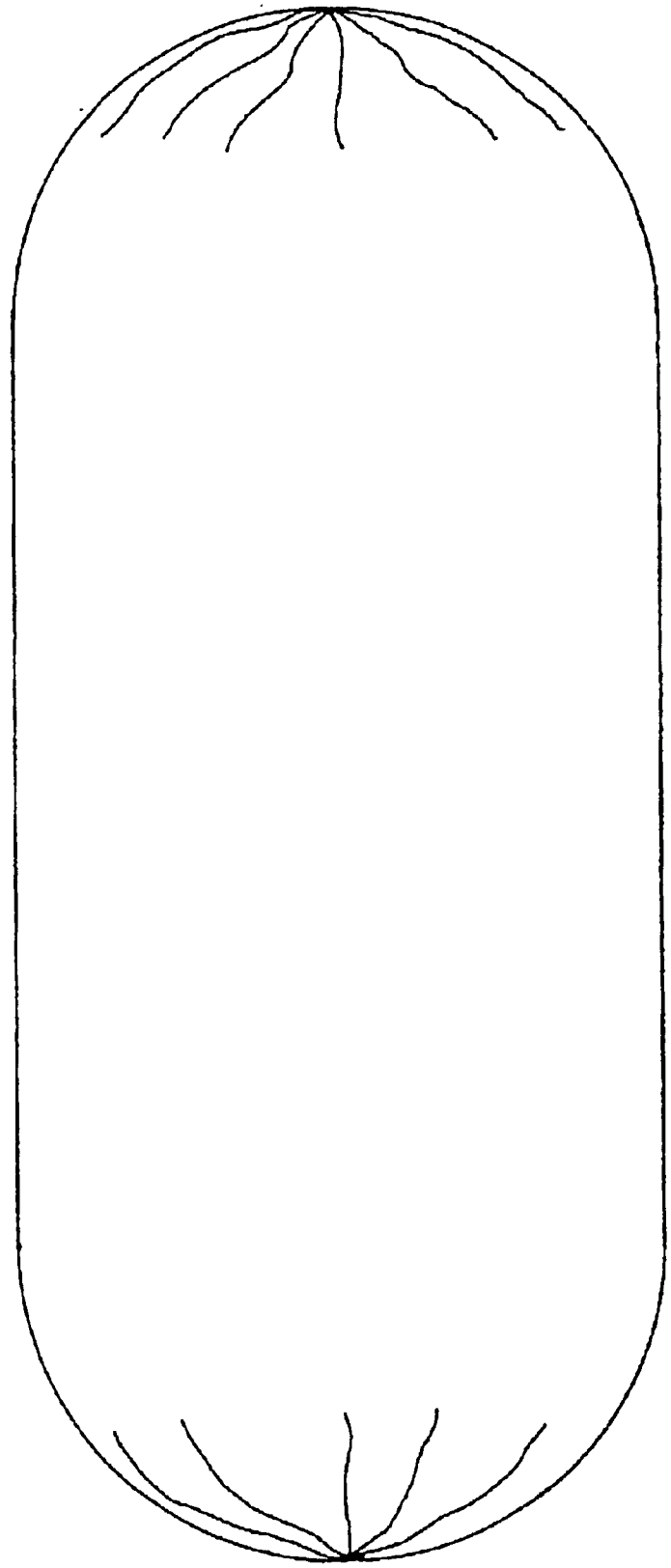

PROCESS FOR PREPARING A MEAT SUBSTITUTE

This application is a continuation-in-part of application Ser. No. 09/230,545, filed on Jan. 28, 1999, now abandoned. Application Ser. No. 09/230,545 is the national phase of PCT International Application No. PCT/IB97/00488 filed on May 5, 1997 under 35 U.S.C. § 371. The entire contents of each of the above-identified applications are hereby incorporated by reference.

TECHNICAL FIELD

The invention concerns a high nutritional value food in alternative to animal meat.

BACKGROUND OF THE INVENTION

This is a Continuation-in-Part application of our previous application Ser. No. 09/230,545 filed on May 5, 1997 now abandoned.

Vegetable meat is composed of natural products based on gluten, cereal flour and legume flour.

This mixture enables a high percentage of protein to be used, which is concentrated in the gluten, minerals (especially iron), vitamins and the food fibers of cereals and legumes.

Its structure enables it to be used as food to be consumed cold to the flavor of mortadella, ham, bresaola, guanciale etc., or hot as steak, stew, mince, hamburger, sausage, pizzaiola, etc.

Other vegetable foods, with high nutritional value, know by the writer, are Seitan and soy by-products like soy steak and soy stew.

The latter are not finished like vegetable meat, because either they lack of same amino acids or food fibers. Moreover, they are unable to produce all types of meat mentioned above (mortadella, etc.).

A prior method of producing vegetable food products of a fibrous nature is known from U.S. Pat. No. 3,886,298 (Hayes et al.). This method requires a step of preparing a mixture of protein material, such as gluten, and water to form a dough, which is then subjected to compression and heating within an extruder chamber, to obtain a product with a meat-like fibrous texture which can then possibly be rehydrated in boiling water.

SUMMARY OF THE INVENTION

How vegetable meat is made:

A percentage of gluten from 45% to 99.9% is mixed with a percentage of one or more cereal flours from 0.1% to 55%, or with a percentage of one or more legume flours from 0.1% to 55%, or with a percentage of one or more cereal and legume flours together from 0.1% to 55%.

This mixture is seasoned with various spices and after being kneaded and worked with water or vegetable broth, afterwards the pieces of required size are prepared and boiled for about two hours.

The list of cereals used for cereal flours is: hard grain, soft grain, buckwheat, kamut grain, oats, barley, pearl barley, maize, rye, spelt, rice.

The list of legumes used for legume flours is: chickpea, pea, broad bean, lentil, bean soya bean, chickling.

The kind of cereal or legume flours, which is used, can be wholemeal, fine, extra fine, bran.

The quality of gluten, cereal and legume flours used can be biological or non-biological. Vegetable meat comes in the form of a piece of meat such as a cylindrical shaped filet with rounded ends.

Its weight may be 0.5 kg., 1 kg., 2 kg., 3 kg., etc., in order to obtain this cylindrical shape, synthetic casings for salami or other forcemeat products may be used.

The list of seasonings used is: garlic, fennel seeds, rosemary, pistachio, paprika, black pepper, chili, salt, basil, parsley, extra pure olive oil, yeast extract, etc. The amount of water or vegetable broth for the flour dough is between 0.8 liters to 1 liter for every kilogram of flour mixture. The various kinds of vegetable meat named above (steak, stew, hamburger, mortadella, ham, etc.) are obtained by changing the percentages of gluten and of cereal and legume flours which have been used, also the different types of cereal and legume flowers (wholemeal, fine, extra fine, bran), and as well as the different types of spices used. The advantages of vegetable meat are the following:

1) It gives anyone not eating meat (vegetarians), anyone who cannot eat it because of cholesterol, uric acids, or digestive problems, the chance to have a complete alternative to animal meat (due to its nutritional value as well as to the range of different kinds of vegetable meat).
2) It can be kept in a fridge in a vacuum-sealed package for 30 days and frozen for 12 months.

DESCRIPTION OF THE DRAWING

The accompanying drawing shows a finished product according to the invention.

DETAILED DESCRIPTION OF THE INVENTION

Let us give an example of how to come up with one kind of vegetable meat:

EXAMPLE 1

"Steak"

The following flours are mixed: gluten 700 grams, wholemeal chickpea 200 grams, wholemeal oats 70 grams, wholemeal spelt 30 grams, with 1 liter of vegetable broth and seasoned with salt, pepper, rosemary, extra olive oil.

The mixture is kneaded until everything is blended and is left to stand for twenty minutes, then the cylindrical shaped pieces of meat are prepared using synthetic casing for salami and it is boiled for one hour and forty-five minutes.

EXAMPLE 2

0.50 l of vegetable broth was added to a mixture consisting of 350 g gluten, 85 g chick-pea flour, 20 g wholemeal oat flour, 30 g wholemeal rye flour and 15 g wholemeal spelt flour and the mixture thus obtained was kneaded into a paste. 300 g of the obtained raw dough were removed and kept as such for subsequent analysis, while the remaining 700 g of dough were stuffed into a substantially unextensible synthetic casing for salami with a 90 mm diameter and 200 mm long.

At first a closure clip was fixed at a distance of about 50 mm from a first end of the synthetic casing; afterwards, the dough was stuffed into the casing up to a distance of about 155 mm from said first end. In this same point, a second clip was fixed so as to close the casing, thus obtaining a cylindrical piece with a diameter of 90 mm and a length of 105 mm. The unstuffed portions of the casing were retained.

This cylindrical piece was dipped into boiling water for 1 h and 45 minutes. At the end of this cooking step, the final cylindrical piece was 160 mm long, because, due to this treatment, the dough had expanded at first in the transverse direction and then, due to the resistance exerted by the synthetic casing, in the longitudinal direction, causing the clips to slide along the unstuffed portions of the casing.

Both the starting raw dough and the final product were subjected to a histo-morphological analysis.

A series of random samplings were carried out on both the starting raw dough and the final product. Then the samples were processed by three different analytical routes for the infiltration, inclusion and cutting thereof and three different microscopy techniques were used.

Three different inclusions of the samples were obtained, namely in paraffin, methacrylate and OCT). Sections of 3-7 $\mu$m were obtained from these inclusions and laid over microscope glass for observation. Observation was carried out in light field, dark field and phase contrast.

A significant difference was detected between the initial raw dough and the final product. The initial dough shows a number of recognizable inclusions, such as apical meristems, cuticles and other residues of vegetable origin, which are dispersed in an amorphous matrix base substance, without any recognizable structure and with a limited vacuolization, caused by air bubbles trapped during the kneading operation.

None of the above inclusions are detected in the final product, which has, instead, a microfibrillar structure with the interposition of air bubbles, so that a trabecular-type structure is formed, which, on closer observation, displays a moderate orientation in the longitudinal direction, although in numerous portions a more twisted orientation of the fibers is detectable.

The above-outlined pattern clearly indicates that this structural morphology is the result of two dynamic actions which have taken place during the cooking step, namely an expansion in the transverse direction and an expansion in the longitudinal direction (front to rear).

The structure of the final product is thus very similar to that of meat and it is obtained without subjecting the initial dough to any step of compression and heating in an extruder, but just through the volume increase of the initial dough and the pressure that is created throughout the mass; this mass, imprisoned inside the casing, pressed and heated, expands and finds room by lengthening, causing the laces to stretch. As a consequence, the gluten fibers within the dough undergo texturization and the texture of the resulting cooked product is very close to that of meat.

As an alternative to the use of a substantially unextensible synthetic casing as in the above example, the use of an extensible synthetic casing can be envisaged, provided that, in such a case, clips are used that cannot slide along the casing.

Industrial Applicability

It is extremely suitable for being produced with a modern industrial system, in fact by using the latest flour mixers and modem boilers for cooking and with an automatic system for vacuum-sealed packing, the product can be made in extremely large quantities.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:
1. A process for producing a vegetable food which is alternative to meat, which process consists of the steps of:
   a) providing a mixture consisting essentially of 45 to 99.9% by weight of gluten and 0.1 to 55% by weight of a flour selected from the group consisting of cereal flours, legume flours and mixtures thereof,
   b) admixing said mixture of gluten and flour with water or vegetable broth, in a ratio of 1 kg of said mixture per 0.8 to 1.0 liter of water or vegetable broth,
   c) kneading the admixture until a dough is obtained,
   d) stuffing the dough into synthetic casings, which are closed with clips or laces at their ends, so as to obtain shaped pieces,
   e) cooking the thus-obtained shaped pieces for 105 to 120 minutes, such that the dough expands and finds room by lengthens, and a meat-like fibrous structure develops, wherein fibers show a moderate orientation in the longitudinal direction and, in numerous portions, a twisted orientation.
2. A process according to claim 1, wherein the flour is a cereal flour.
3. A process according to claim 2, wherein the cereal flour is selected from the group consisting of hard wheat flour, soft wheat flour, buckwheat flour, kamut grain flour, oat flour, barley flour, pearl barley flour, maize flour, rye flour, spelt flour and rice flour.
4. A process according to claim 1, wherein the flour is a legume flour.
5. A process according to claim 4, wherein the legume flour is selected from the group consisting of chickpea flour, pea flour, broad bean flour, lentil flour, soybean flour and chichilin flour.
6. A process according to claim 2 or 4, wherein the cereal and/or legume flour is wholemeal flour, fine flour, extra fine flour or bran.
7. A process according to claim 1, wherein the flour is a mixture of a cereal flour and legume flour.
8. A process according to claim 1, wherein the flour is a mixture of one legume flour and at least two cereal flours.
9. A process according to claim 1, wherein the flour is a mixture of a cereal flour and at least two legume flours.
10. A process according to claim 1, wherein the flour is a mixture of at least two cereal flours and at least two legume flours.
11. A process according to claim 1 wherein the gluten and/or the cereal flour and/or the legume flour is biological.
12. A process according to claim 1, further comprising the step of seasoning the mixture of gluten and flour.
13. A process according to claim 12, wherein said seasoning step is carried out by adding at least one ingredient selected from the group consisting of garlic, fennel seeds, rosemary, pistachio, paprika, black pepper, chili, salt, basil, parsley, extra pure olive oil and yeast extract.
14. A process according to claim 1, wherein said mixture of gluten and flour is admixed with water.
15. A process according to claim 1, wherein said mixture of gluten and flour is admixed with vegetable broth.

* * * * *